United States Patent
Stough

(10) Patent No.: US 10,843,650 B2
(45) Date of Patent: Nov. 24, 2020

(54) PEDAL ASSEMBLY FOR A MOTOR VEHICLE

(71) Applicant: CJ AUTOMOTIVE AB

(72) Inventor: Jon David Stough, Angola, IN (US)

(73) Assignee: CJ AUTOMOTIVE AB, Dalstorp (SE)

( * ) Notice: Subject to any disclaimer, the term of this patent is extended or adjusted under 35 U.S.C. 154(b) by 0 days.

(21) Appl. No.: 16/615,186

(22) PCT Filed: Jun. 11, 2018

(86) PCT No.: PCT/SE2018/050604
§ 371 (c)(1),
(2) Date: Nov. 20, 2019

(87) PCT Pub. No.: WO2018/236267
PCT Pub. Date: Dec. 27, 2018

(65) Prior Publication Data
US 2020/0156581 A1    May 21, 2020

(30) Foreign Application Priority Data
Jun. 22, 2017   (SE) ...................................... 1750803

(51) Int. Cl.
*G05G 1/32*    (2008.04)
*B60R 21/09*   (2006.01)
(Continued)

(52) U.S. Cl.
CPC .............. *B60R 21/09* (2013.01); *B60K 23/02* (2013.01); *B60T 7/065* (2013.01); *G05G 1/327* (2013.01); *B60K 2023/025* (2013.01)

(58) Field of Classification Search
CPC .......... G05G 1/32; G05G 1/327; B60R 21/09; B60T 7/065
See application file for complete search history.

(56) References Cited

U.S. PATENT DOCUMENTS

| | | | |
|---|---|---|---|
| 2005/0050980 A1* | 3/2005 | Park | ..................... B60T 7/065 74/512 |
| 2007/0137394 A1 | 6/2007 | Park | |

(Continued)

FOREIGN PATENT DOCUMENTS

| | | |
|---|---|---|
| EP | 1709505 A1 | 10/2006 |
| EP | 2578454 A1 | 4/2013 |
| WO | 2016132579 A1 | 8/2016 |

OTHER PUBLICATIONS

International Search Report (dated Aug, 7, 2018) for corresponding International App. PCT/SE2018/50604.

(Continued)

*Primary Examiner* — Luis A Gonzalez
(74) *Attorney, Agent, or Firm* — WRB-IP LLP

(57) ABSTRACT

A pedal assembly for a motor vehicle includes a bracket with a first groove, a pedal shaft arranged in the first groove and a pedal arm pivotally coupled to the bracket via the pedal; an operating device and at least one locking device. The operating device is arranged for activation or control of a vehicular function and is pivotally coupled to the pedal arm. The locking device is arranged for locking of the pedal shaft in an operating position, and in the event of a collision, it is releasable to allow movement of the pedal shaft from the operating position to a safety position. The bracket has a second groove. A locking pin is arranged in a locking position in the second groove in order to prevent the release of the locking device. An actuator device is arranged to activate the safety arrangement by releasing the locking device from the locking pin in mechanical way by an external force caused by the collision onto the actuator device, thereby allowing the pedal shaft to move from the operating position to the safety position.

13 Claims, 6 Drawing Sheets

(51) Int. Cl.
*B60T 7/06* (2006.01)
*B60K 23/02* (2006.01)
*G05G 1/327* (2008.04)

(56) References Cited

U.S. PATENT DOCUMENTS

| | | | |
|---|---|---|---|
| 2007/0137398 A1* | 6/2007 | Tokumo | B60R 21/09 |
| | | | 74/512 |
| 2007/0266815 A1* | 11/2007 | Johansson | G05G 1/32 |
| | | | 74/512 |
| 2008/0000709 A1 | 1/2008 | Tanigawa et al. | |
| 2008/0006119 A1* | 1/2008 | Tokumo | B60T 7/065 |
| | | | 74/560 |
| 2009/0250285 A1 | 10/2009 | Allen et al. | |
| 2012/0096982 A1* | 4/2012 | Blais | G05G 1/327 |
| | | | 74/560 |
| 2012/0137823 A1 | 6/2012 | Kim et al. | |
| 2013/0087010 A1 | 4/2013 | Kapocs et al. | |
| 2013/0125698 A1* | 5/2013 | Burguera Albizuri | B60R 21/09 |
| | | | 74/560 |
| 2014/0182411 A1* | 7/2014 | Sato | G05G 1/327 |
| | | | 74/512 |
| 2015/0232072 A1 | 8/2015 | Periasamy et al. | |
| 2017/0050625 A1 | 2/2017 | Kawazu et al. | |

OTHER PUBLICATIONS

Swedish Search Report (dated Feb. 16, 2018) for corresponding Swedish App. PCT/SE2018/050604.

* cited by examiner

PEDAL ASSEMBLY FOR A MOTOR VEHICLE

BACKGROUND AND SUMMARY

The invention considers a pedal assembly for a motor vehicle designed to allow a movement of the pedal from an operating position to a safety position, in the event of a collision.

Collision safety is of great importance in modern cars and systems for minimizing injuries of the driver and passengers are developed. Modern cars are designed to keep the passenger compartment intact at a collision, but allow for example the front of the car to partly "collapse" for taking up the force of the crash. In prior art, different kinds of safety arrangements for vehicle pedals are known. Particularly, it is known to arrange a pedal assembly where the pedal is allowed to move forward relative to the driving direction of the vehicle, in the event of a collision. This is to minimize injuries of the driver's feet if the pedal structure moves towards the driver upon a collision. Document EP 2 578 454 B1 describes a safety arrangement for a vehicle pedal such as a brake pedal or a clutch pedal. The safety arrangement describes a first operating position and a second safety position. The safety arrangement comprises a pedal structure and a pedal hub and the pedal structure comprises a pedal arm and a bracket. The pedal arm is connected to an operating device (brake booster) by an arm. A release device is connected to the pedal structure by a release pivot axis. In the first position, the release device holds the pedal structure in the first position relative to the hub. Thus, the locking device forms a mechanical stop for the release device. The bracket has a slot, wherein the locking device is allowed to move when the release device is displaced from a first position to a second position. The safety arrangement further comprises a triggering means e.g. a pyrotechnical means. There is also provided a locking device remover, having an inclined slot, in which the locking device may move. Further, the release device is allowed to rotate around a pivot axis, when displaced from the first position to the second position. In the second position, the release device abuts against the hub. In the second position, the pedal structure is operatively decoupled from the hub. Upon a collision, a collision sensor may trigger the triggering device, and generate a release force which will push the locking device remover and move the locking device in the slot. Thus, when the locking device is moved out of the way of the release device, the release device is allowed to move from the first position to the second position where the release device abuts against the hub. Further, the release device allows the hub to move from a lower position of the passage to an upper portion. The force used for displacing the hub from a first position to a second position comes from the foot of the driver on the pedal place or by the deceleration of the vehicle. When the pedal structure is in the second position, braking is still possible at reduced stroke. The above system only presents a triggering device which is pyrotechnical, and which is activated by means of collision sensors. Thus, the system is relying on collision sensors to work properly. Further, in the second position the pedal structure is operatively decoupled from the hub.

Another solution is presented in document EP 1 709 505 B1, which also presents a safety arrangement for a vehicle pedal with a first operating position and a second safety position. The safety arrangement comprises a pedal support for a vehicle with a bracket which is secured in a bulkhead disposed in the vehicle between the passenger compartment of the vehicle and the engine room. A first shaft is secured in the bracket, horizontal and transversely directed in relation to the direction of travel of the vehicle, and a pedal arm provided with a footplate, is pivotally arranged about the first shaft. For maneuvering or controlling a vehicle function, for example a braking function, an operating device is pivotally arranged in the pedal arm at a distance from the first shaft. According to the invention, the first shaft is movably disposed in the bracket in the direction of travel of the vehicle, in the event of a collision. Thus, the first shaft has a normal position locked by means of a locking device, and the locking device is, in the event of a collision, openable for permitting displacement of the first shaft to a safety position where the footplate is displaced away from the legs/feet of the vehicle driver but where the function of the operating device is at least partly retained. This solution also is triggered by sensors, which means that the system is dependent of the functionality of the sensors.

It is desirable to address at least some of the problems and issues outlined above.

According to an aspect of the invention, a pedal assembly for a motor vehicle is provided, which pedal assembly is arranged to move the pedal away from the driver's feet in the event of a crash. The pedal assembly comprises a bracket with a first groove, a pedal shaft arranged in the first groove, a pedal arm with a first end and a second end, the second end comprising a pedal plate; and the pedal arm is pivotally coupled to the bracket via the pedal shaft at a position distant from the second end. Further, the pedal assembly comprises an operating device and at least one locking device. The operating device is arranged for activation or control of a vehicular function, such as a breaking function, a clutching function or the like and the operating device is pivotally coupled to the pedal arm at an operating device shaft distant from the pedal shaft. The at least one locking device is arranged for locking of the pedal shaft in an operating position in the first groove and the locking device is coupled to the bracket via a locking device shaft. In the event of a collision, the locking device is releasable to allow movement of the pedal shaft in the first groove from the operating position to a safety position. The pedal assembly is characterized by that the bracket has a second groove, a locking pin arranged in a locking position in the second groove in order to prevent the release of the locking device and an actuator device arranged to activate the safety arrangement by releasing the locking device from the locking pin. Thus, the locking pin is movably disposed relative to the bracket along the second groove from its locking position to a release position in which the locking device is released. The actuator device is attached to an actuator device shaft and the actuator device is further fastened relative to the bracket at a distance from the actuator device shaft by at least one fastening device. The actuator device is further arranged to rotate around an axis defined by the actuator device shaft in the event of a collision. This takes place by means of an external force caused by the collision onto the actuator device, wherein the actuator device is arranged to shear the at least one fastening device and further displace the locking pin from its locking position to the release position. In the latter position the locking device is allowed to rotate around the axis of the locking device shaft as the result of the external force, thereby allowing the pedal shaft to move from the operating position to the safety position.

Such an arrangement is pure mechanical and the locking pin prevents the release of the locking device. The invention also comprises the actuator device which is a mechanical triggering mechanism which is arranged to release the locking device. In the event of a crash, the dash panel of the vehicle intrudes into the passenger compartment, moving the pedals toward the driver. This motion relative to the stable Instrument Panel Structure (IPS) is harnessed to activate the release mechanism. Accordingly, the actuator device moves the lock pin in the slot to release the locking device. When the drivers foot is pressing the pedal plate during a collision, the result is similar as in EP 1790505 B1—the pedal moves forward, but the releasing mechanism differs. This is a cost-efficient and well-functioning solution compared to prior art solutions, for providing a safety arrangement for the pedals of a motor vehicle.

According to an embodiment, the first groove comprises a first end and a second end corresponding to the operating position and the safety position. In this embodiment, the second end of the groove is open, thereby allowing the pedal shaft being completely detached from the bracket. By allowing the pedal shaft being completely detached, the second end of the pedal arm will move away from the driver's foot as far as possible, without being stopped by the bracket.

According to another embodiment, the actuator device shaft is the same as the locking device shaft, which is a cost-efficient solution with less parts compared to prior art. Of course, the actuator device shaft could be a separate shaft without connection to the locking device shaft.

According to another embodiment, the actuator device has an arcuate form with a first end for receiving the external force and a second end, which is attached to the locking device shaft, and the at least one fastening device is arranged between the first end and the second end of the actuator device. The arcuate form, preferably with a smooth bend, enables the locking pin to "slide" on the outside of the same and thereby being displaced in the second groove, out of the way from the locking device. This is a solid and well-functioning solution where the locking pin is easily pushed in the second groove by the outside of the actuator device without being jammed during the movement.

According to an embodiment, the actuator device is a fork-like bracket which comprises two shanks connected to each other in the first end. The respective shank each comprises the second end which respective second end is attached to the locking device shaft. By the fork-like bracket the force from the crash is, via the Instrument Panel Structure, applied on the common end and is transferred to a rotating movement of the actuator via the link between the respective shank and the locking device shaft. During this rotation, the fastening device is sheared and the locking pin is moved in the second groove by the actuator device, to simultaneously release the at least one locking device. This is a robust solution of the activation of the release mechanism.

According to another embodiment, the fastening device has a known shearing strength. The fastening device can be any kind of solution applied to prevent the actuator device from rotating when it is in its normal operating position, for example a rivet, a plastic plug, a locking lug, a protrusion or the like. By having a fastening device with a predetermined (tested) and thereby known shearing strength the force needed for shearing it is known and can be decided/tested.

According to a preferred embodiment, the fastening device is a rivet. A rivet is a simple fastening device which is easy to manufacture and thereby cost effective and having a specified shearing strength.

According to an embodiment, the locking device has a first end which is arranged to lock the pedal shaft in the operating position, and a second end distant from the first end, which second end comprises a recess. The recess is arranged to hold the locking pin in its locking position. By this arrangement the locking device is secured in the locking position by the first end in any case until the actuator device is triggered and releases the locking pin from the recess, and thereby allows the locking device to be released. When the locking device is released, the movement of the pedal shaft from the operating position to the safety position is allowed.

According to an embodiment, the locking device shaft is arranged between the first end and the second end of the locking device, and the locking device further is pivotally coupled at the locking device shaft. By this arrangement the locking device is arranged to rotate around the locking device shaft to be released, but only if the lock pin is out of the way. A simple and secure solution of the triggering/releasing mechanism is hereby provided.

According to another embodiment, the bracket comprises two substantially similar plates arranged on respective side of at least a part of the pedal arm. The respective plate each comprises the first groove, i.e. one first groove is arranged in each plate, and the pedal shaft is extending between the first grooves. Thereby the bracket is robust and enables a robust pivotally attachment of the pedal between the plates.

According to a preferred embodiment of the nearest above presented embodiment, the respective plate each comprising also the second groove, i.e. one second groove is arranged in each plate, and the locking pin extends between the both second grooves. Thus, one common lock pin is provided for both sides, which enables the possibility to have one common actuator bracket. Less parts and thereby a cost-effective solution is provided.

According to an embodiment, the locking device shaft extends between the two substantially similar plates and the actuator device is arranged in between the two plates. This arrangement has few parts and enables the use of only one actuator bracket. Further, this prevents one side from releasing the other side, which is a double security.

According to an embodiment, the pedal assembly further comprises at least one guiding console for guiding the actuator device towards the robust Instrument Panel Structure. The at least one guiding console is arranged for example on one or more sides of the actuator device to direct the same during the impact. This is advantageous over prior art since it is a way to secure that the force from the collision will hit the actuator bracket at a correct position and thereby securing the function of the release mechanism.

According to yet another embodiment, each plate comprises one locking device arranged on a respective outside of each plate. This solution balances the load and prevents misalignment as well as a protection against unintentional releasing of the safety function.

According to an embodiment, each plate comprises one locking pin arranged on the respective outside of each plate.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a pedal assembly is provided that gives a cost-efficient and well-functioning solution for providing a safety arrangement for the pedals of a motor vehicle, in which the lower part of the pedal arm moves away from the foot of the driver in the event of a crash. The arrangement according to the invention is pure mechanical and comprises an actuator device which is a mechanical triggering mechanism and which is arranged to release a locking device. The locking device in turn holds an upper part of the pedal arm in a normal operating position. In the event of a crash, the dash panel of the vehicle intrudes into the passenger compartment, moving the pedals toward the driver. This motion relative structurally stable elements of the Instrument Panel Structure (IPS) is harnessed to activate the release mechanism in which the actuator device impacts a locking pin, to allow a release of the locking device from its locking position to an open position. By that the upper end of the pedal arm is allowed to move from an operating position to a safety position. When the driver's foot is pressing the pedal plate during a collision, the upper end of the pedal moves towards the driver simultaneously as the lower part of the pedal moves forward, away from the driver's feet.

Figure 1:
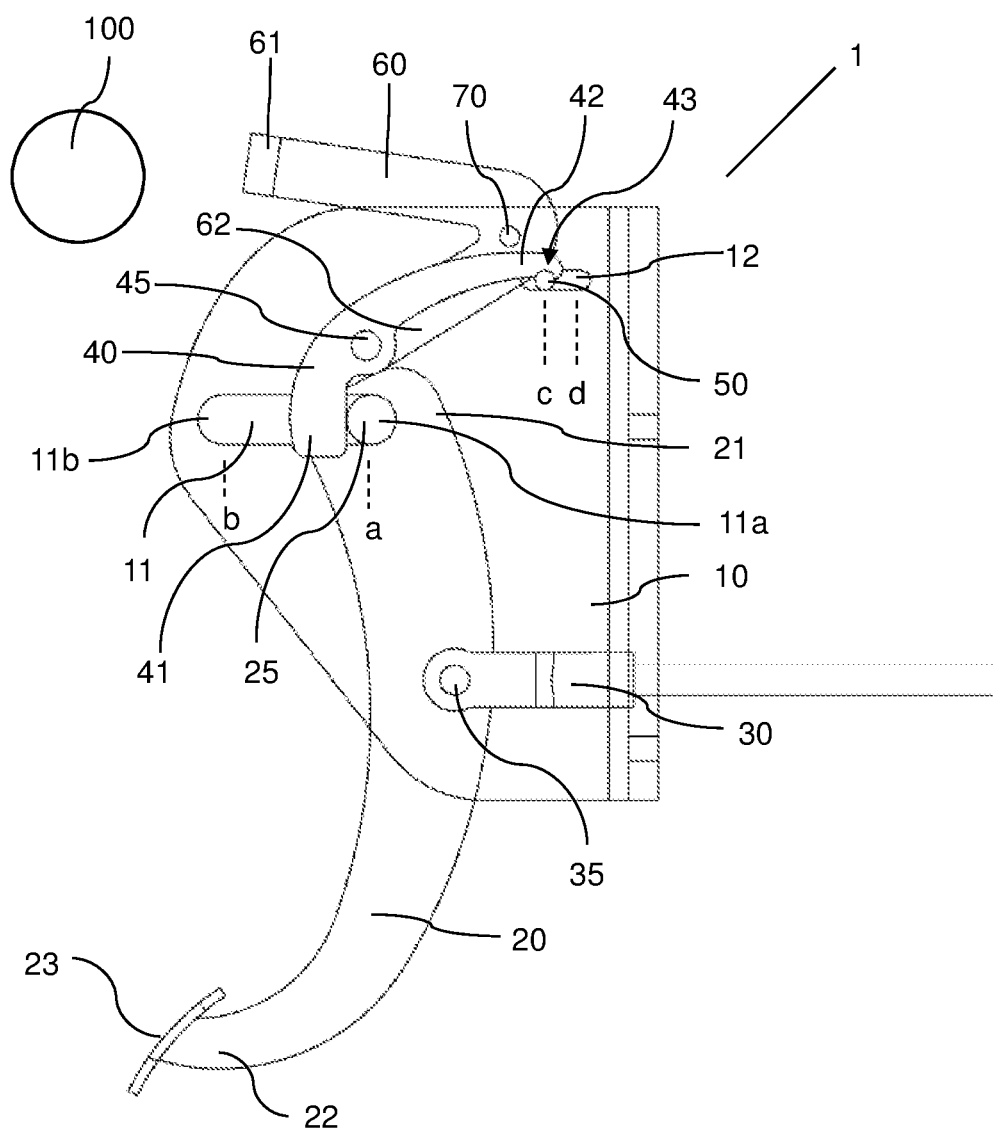
FIG. 1 is a side view of a pedal assembly, according to an embodiment of the invention, when the pedal assembly is in a normal operating position.

FIG. 1 shows a pedal assembly 1 according to an embodiment, in a normal operating position. The pedal assembly 1 comprises a bracket 10 which normally is attached in a bulkhead (not shown) disposed in the motor vehicle between the passenger compartment and the engine room. The bracket 10 comprises a first groove 11 in which a pedal shaft 25 is arranged. A pedal arm 20, with a first end 21 and a second end 22, is pivotally coupled to the bracket 10 via the pedal shaft 25 at a position distant from the second end 22. The second end 22 is the free end of the pedal arm 20 which also comprises a pedal plate 23. For activation or control of a vehicular function, such as a breaking function, a clutching function or the like, an operating device 30 is pivotally coupled to the pedal arm 20 at an operating device shaft 35 distant from the pedal shaft 25.

The pedal assembly 1 further comprises at least one locking device 40, for locking of the pedal shaft 25 in an operating position a in a first end 11a of the first groove 11. The locking device 40 is pivotally coupled to the bracket 10 via a locking device shaft 45 and the locking device 40 is releasable in the event of a collision, to allow movement of the pedal shaft 25 in the first groove 11, from the operating position a to a safety position b. The safety position b is defined by a second end 11b in the groove 11. The locking device 40 further comprise a first end 41 which is arranged to lock the pedal shaft 25 in the operating position a, and a second end 42 distant from the first end 41. Preferably the first end 41 and the second end 42 is arranged at respective side of the locking device shaft 45. The second end 42 of the locking device 40 comprises a recess 43. The safety position b mentioned above is a position where the first end 21 of the pedal arm 20, after the movement of the pedal shaft 25—and thereby also the movement of the first end 21—has moved towards the driver at the same time as the second end 22 of the pedal arm 20 has moved away from the driver, if the foot of the driver presses the pedal plate (see FIG. 4-5). The bracket 10 also comprises a second groove 12 in which a locking pin 50 is arranged. Said locking pin 50 is arranged in a locking position c in the second groove 12, in order to prevent the release of the locking device 40. The release is prevented by that the locking pin 50 in its locking position c is arranged in the recess 43 of the second end 42 of the locking device 40, and by that arrangement preventing the locking device 40 from turning around the locking device shaft 45. Further, the locking pin 50 is movably disposed relative to the bracket 10 along the second groove 12 from its locking position c to a release position d in which the locking pin 50 is moved out of the recess 43 and thereby allowing the locking device 40 to be able to turn around an axis z, defined by the locking device shaft 45.

In the preferred embodiment, the pedal assembly 1 further comprises an actuator device 60, which is a mechanical triggering mechanism which is arranged to release the locking device 40 in the event of a crash. The actuator device 60 has an arcuate form with a first end 61 for receiving the external force from an instrument panel structure 100 of the vehicle, and a second end 62, which is pivotally attached relative to the bracket 10 via the locking device shaft 45. The actuator device 60 is further attached to the bracket 10 in a second point by at least one fastening device 70, arranged between the first and the second end 61, 62 and at a distance from the locking device shaft 45. The fastening device 70 is in the preferred embodiment a rivet with well-defined shearing stress, but could also be other types of fastening devices for example a plastic plug or the like. The actuator device 60 is as mentioned above arranged to rotate around the axis z defined by the locking device shaft 45 in the event of a collision, by means of an external force caused by the collision onto the first end 61 of the actuator device 60. In the event of a crash, the dash panel of the vehicle intrudes into the passenger compartment, moving the pedals toward the driver. This motion relative structurally stable elements of the instrument panel structure 100 causes the force onto the first end 61 of the actuator device 60. This is further explained in connection to FIGS. 2-5. Since the actuator device 60 is pivotally arranged, the fastening device 70 has the function of holding or preventing the actuator device 60 from pivoting around the locking device shaft 45 in the normal operating position a. In the preferred embodiment, a fastening device 70 is used, and by fastening device is understood that it could be other types of "stops", for example a rivet, a protrusion, a tab or the like.

Figure 2:
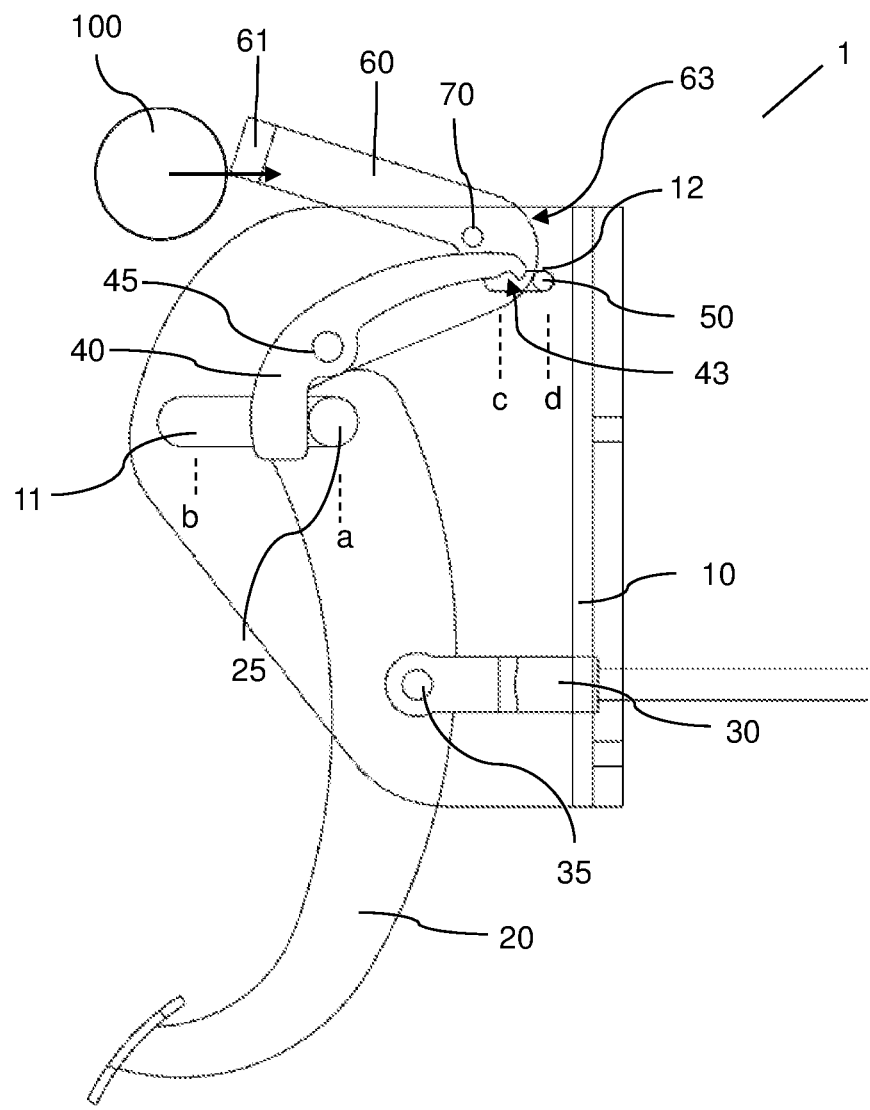
FIG. 2 is a side view of the pedal assembly of FIG. 1 in an initial phase of a crash situation, where an actuator device enables a release of a locking device, which in turn preventing the upper end of the pedal to move from the operating position to a safety position.

FIG. 2 shows the pedal assembly 1 in an initial phase of a crash situation, where the crash force from the instrument panel structure 100 acts on the first end 61 of the actuator device 60. This initiates a rotating movement of the actuator device 60 around the locking device shaft 45, and by that the actuator device 60 shears the rivet 70. By that the rivet 70 is sheared, the actuator device 60 continues its rotating movement and pushes the locking pin 50 out of the recess 43, from its locking position c, along the second groove 12 to the release position d. The arcuate form of the actuator device 60 facilitates a sliding contact between the locking pin 50 and the outside 63 of the actuator device 60, wherein the movement along the second groove 12 is well-functioning.

Figure 3:
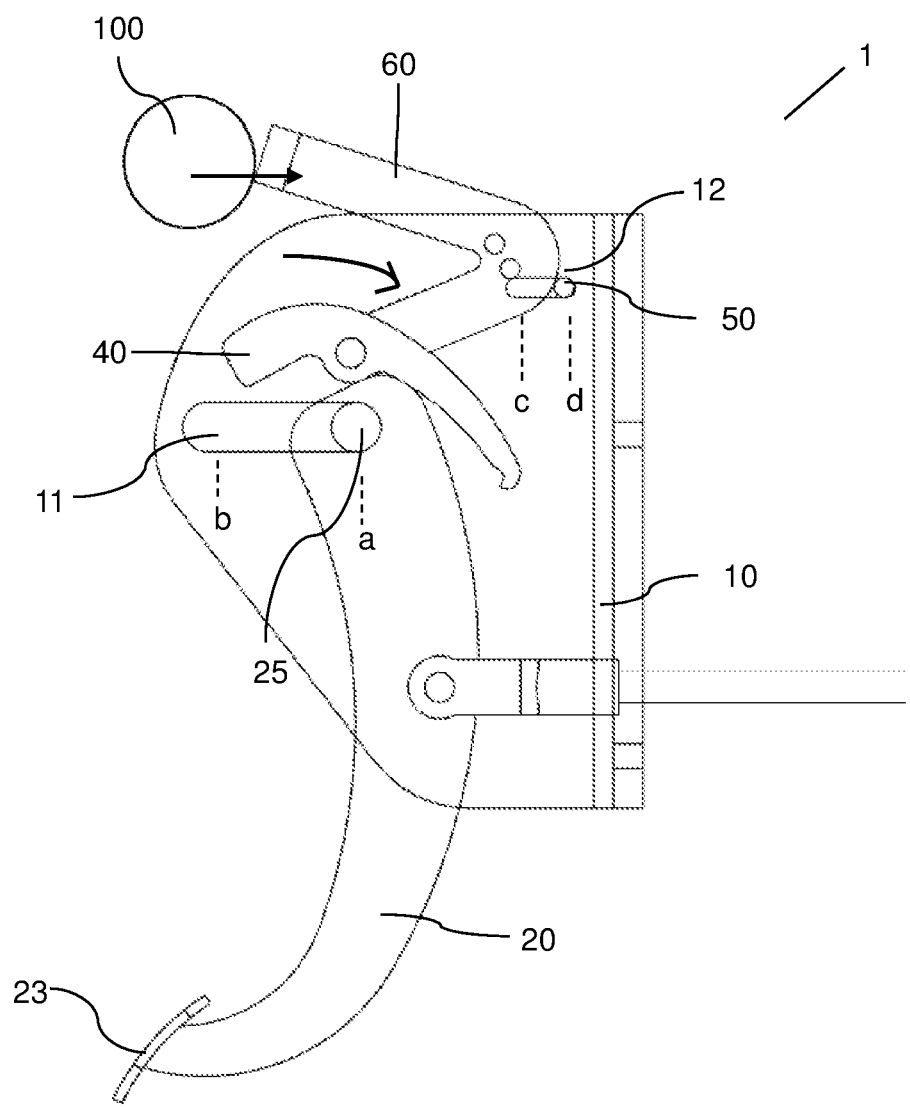
FIG. 3 is another side view of the pedal assembly of FIG. 1 in which the locking device is in an open position, allowing the movement from the operating position to the safety position.

FIG. 3 is shows the pedal assembly 1 in a state where the locking device 40 is decoupled from the locking pin 50, as described above, and thereby free to rotate to an open position, allowing the movement of the pedal shaft 25 from the operating position a to the safety position b, along the first groove 11. The figure illustrates the decoupled state, but the actual rotation of the locking device 40 will normally occur when the driver presses the pedal plate 23 or due to the inertia of the pedal arm and the rapid deceleration of the vehicle, which initiates the actual movement of the pedal shaft 25 in the first groove 11, see FIG. 4.

Figure 4:
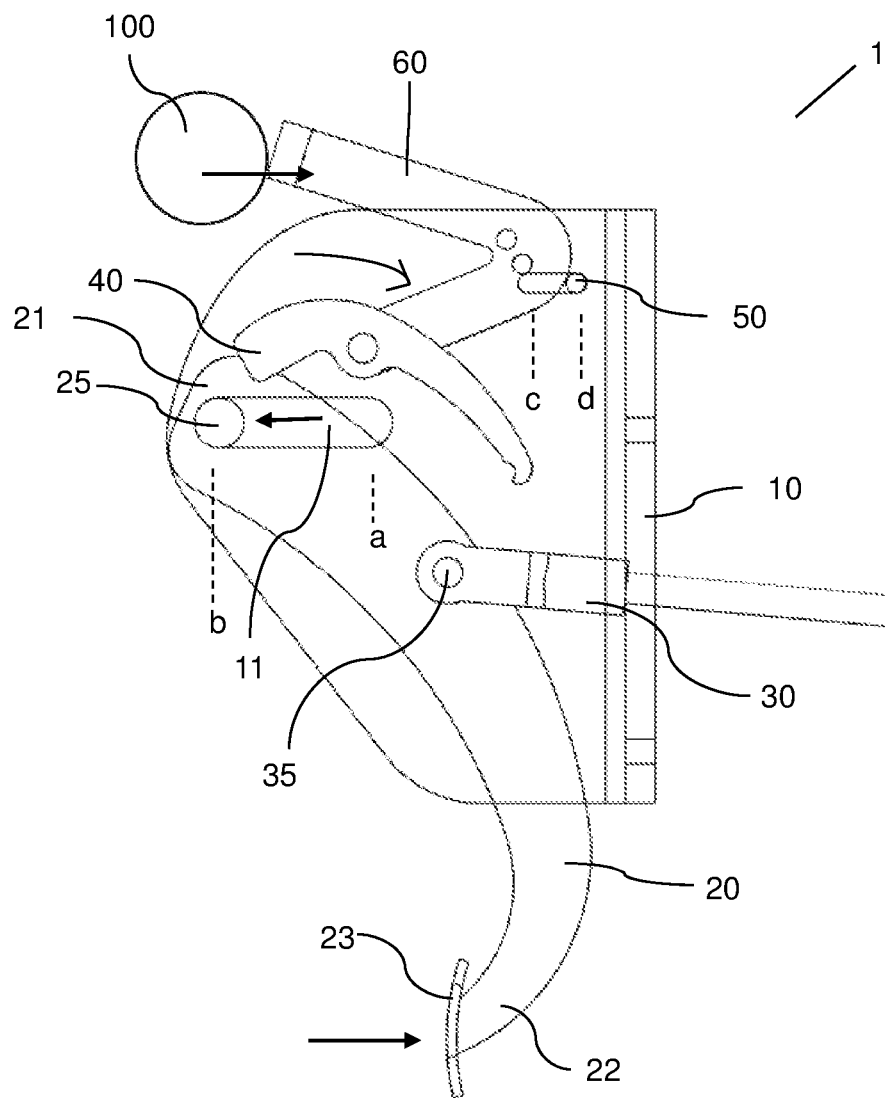
FIG. 4 is showing the pedal assembly of FIG. 1 in its safety position, where the lower end of the pedal is moved away from the driver's foot.

FIG. 4 shows the next phase of the safety arrangement in which the pedal assembly 1 is in its safety position b. When the driver of the vehicle presses the foot on the pedal plate 23, at the same time as a crash enables the release of the locking device 40, the second end 22 of the pedal arm 20 is moved away from the driver's foot. This is possible because of the movement of the first end 21 of the pedal arm 20, via the movement of the pedal shaft 25 in the first groove 11, from the operating position a to the safety position b. Further, the operating device 30 is pivotally coupled to the pedal arm 20 at the operating device shaft 35, distant from the pedal shaft 25, for enabling the movement along the first groove 11, and still have at least a limited control of the vehicle function (breaking function, clutching function etc.).

Figure 5:
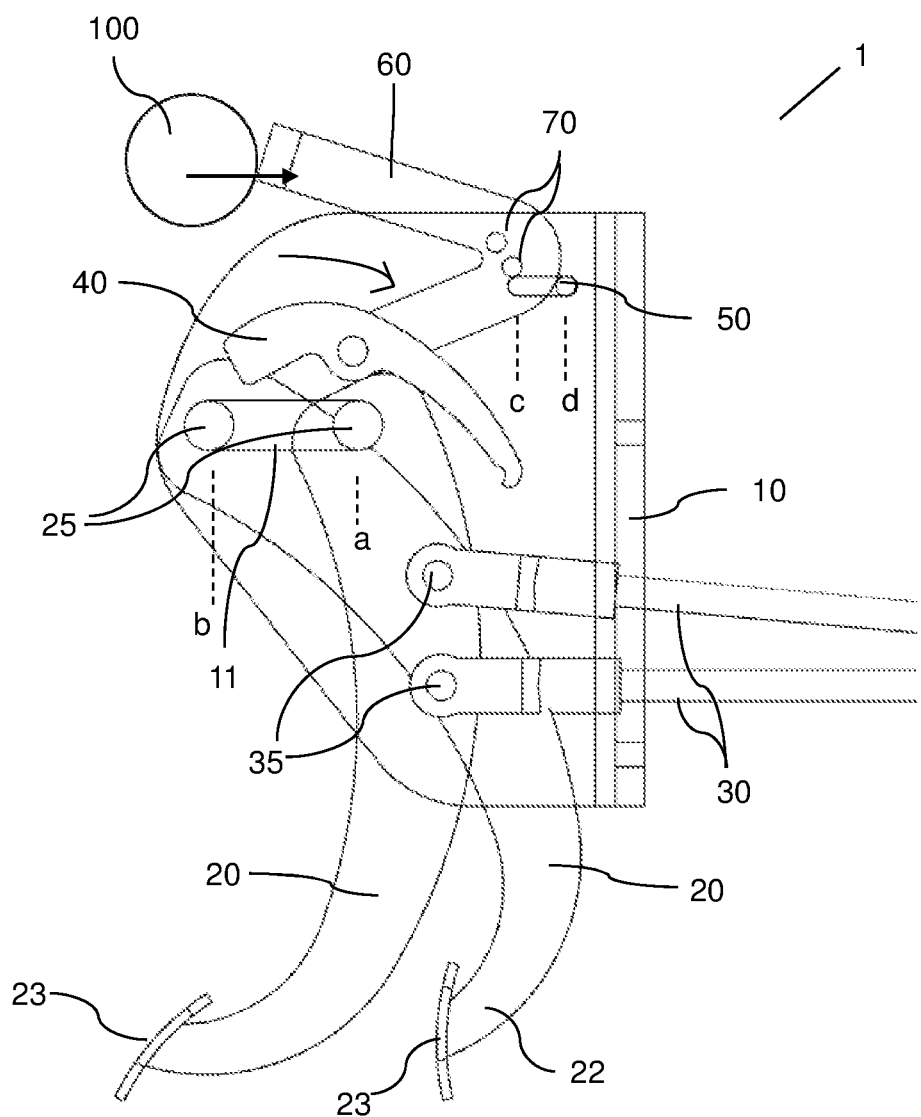
FIG. 5 is showing the pedal assembly of FIG. 1 in its operating position and in its safety position, to illustrate the different locations of the parts in the two different positions.

FIG. 5 shows the pedal assembly 1 both in its operating position a and in its safety position b, to illustrate the different locations of the parts in the two different positions a, b. It is clear that the displacement of the operating device 30, via the pivotally attachment to the pedal arm 20 is essential to allow the movement of the pedal shaft 25 along the first groove 11. Also, the different positions of the rivet 70, in its fastening position and in its sheared positions, are visible in the figure.

Figure 6:
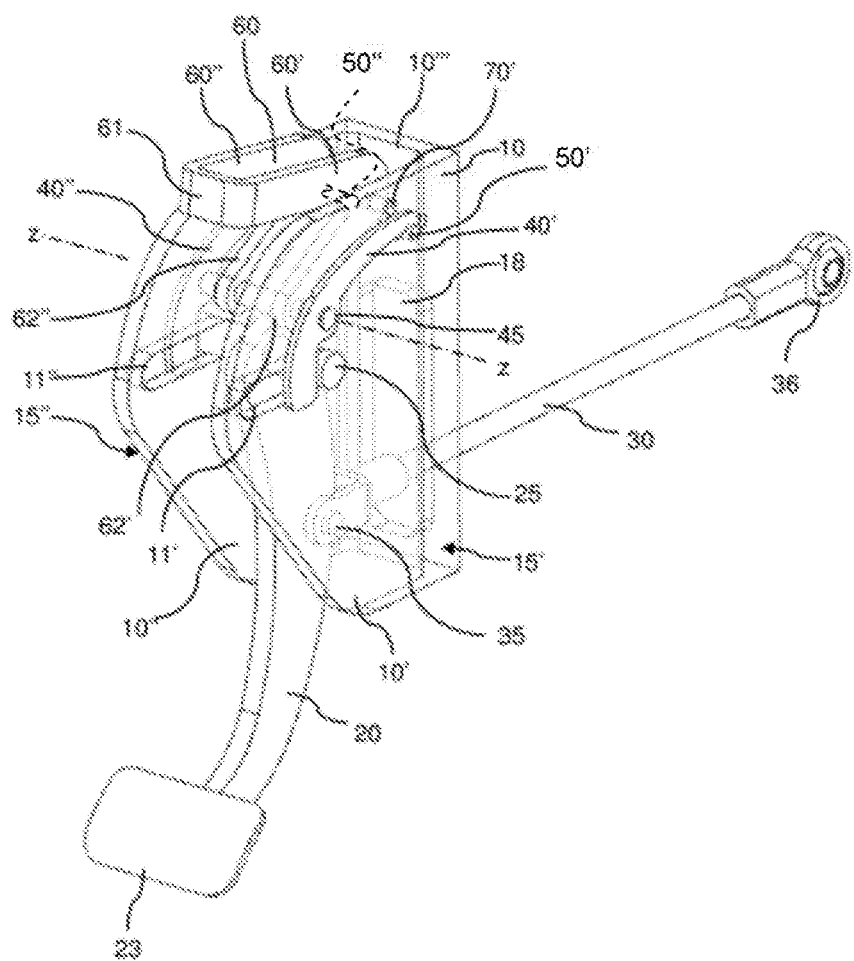
FIG. 6 is a perspective view of the pedal assembly of FIG. 1.

FIG. 6 is a perspective view of the pedal assembly 1. In a preferred embodiment of the invention, the bracket 10 comprises two substantially similar plates 10', 10" protruding from a common front plate 10''', and the plates 10', 10" are arranged on respective side of at least a part of the pedal arm 20. The respective plate 10', 10" each comprises the first groove 11', 11", and the pedal shaft 25 extending between the first grooves 11', 11". Further, the bracket 10 comprises an opening 18, arranged in the front plate 10''', in which opening 18 the operating device 30 is extending thru. It can also be seen that the operating device 30 comprises a second end 36, distant from the operating device shaft 35, and which second end 36 in turn also comprises a pivotally link to another part/function of the vehicle (not shown). In one embodiment, the respective plate 10', 10" also comprises the second groove 12', 12" (not visible in the figure), and the locking pin 50 extending between the second grooves 12', 12", as a common locking pin 50.

In one embodiment each plate 10', 10" comprises one respective locking device 40', 40" arranged on a respective outside 15', 15" of each plate 10', 10" and also secured in the operating position a by a respective rivet 70', 70". Further, it is preferred with a double security of the locking mechanism by that, each plate 10', 10" comprises one locking pin 50', 50" (locking pin 50" shown in phantom in FIG. 6) arranged on the respective outside 15', 15" of each plate 10', 10". So, if one locking pin 50', 50" unintentionally is loosened, despite no crash situation, there is always another locking device 40', 40" active. In the event of a crash, both rivets 70', 70" are sheared and both locking devices 40', 40" are released.

In the preferred, the locking device shaft 45 is a common shaft extending between the two substantially similar plates 10', 10" and the actuator device 60 is arranged in between the two plates 10', 10".

In one preferred embodiment, the actuator device 60 is a fork-like bracket comprising two shanks 60', 60" connected to each other in the first end 61, and the respective shank 60', 60" comprises the second end 62', 62", which respective second end 62', 62" is attached to the locking device shaft 45.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein and are intended to be encompassed hereby.

The invention claimed is:

1. A pedal assembly for a motor vehicle, comprising:
    a bracket having a first groove,
    a pedal, shaft arranged in the first, groove,
    a pedal arm with a first end and a second end, the second end comprising a pedal plate and the pedal arm being pivotally coupled to the bracket via the pedal shaft at a position distant from the second end,
    an operating device for activation or control of a vehicular function, such as a braking function, a clutching function the like, and which operating device is pivotally coupled to the pedal arm at an operating device shaft distant from the pedal shaft,
    at least one locking device, for locking of the pedal shaft in an operating position in the first groove, the locking device being coupled to the bracket via a locking device shaft, wherein the locking device is releasable in the event of a collision, to allow movement of the pedal shaft in the first groove from the operating position to a safety position,
    the bracket having a second groove, a locking pin arranged in a locking position in the second groove, in order to prevent the release of the locking device, and which locking pin is movably disposed relative to the bracket along the second groove from its locking position to a release position in which the locking device is released, and
    an actuator device attached to an actuator device shaft and the actuator device is further fastened relative to the bracket at a distance from the actuator device shaft by at least one fastening device, and the actuator device is arranged to rotate around an axis defined by the actuator device shaft in the event of a collision, by means of an external force caused by the collision onto the actuator device, wherein the actuator device is arranged to shear the at least one fastening device and further displace the locking pin from its locking position to the release position, whereby the locking device is allowed to rotate around the axis of the locking device shaft, as the result of the external force, thereby allowing the pedal shaft to move from the operating position to the safety position, wherein the actuator device shaft is the locking device shaft.

2. Pedal assembly according to claim 1, wherein the first groove comprises a first end corresponding to the operating position and a second end corresponding to the safety position.

3. Pedal assembly according to claim 1 wherein the actuator device has an arcuate form with a first end for receiving the external force and a second end attached to the actuator device shaft, and the at least one fastening device is arranged between the first end and the second end.

4. Pedal assembly according to claim 1, wherein the fastening device has a known shearing strength.

5. Pedal assembly according to claim 1, wherein the fastening device is a rivet.

6. Pedal assembly according to claim 1, wherein the bracket comprises two substantially similar plates arranged on a respective side of the pedal arm, the first groove comprises one groove in each plate, and the pedal shaft extending between the first grooves.

7. Pedal assembly according to claim 6, wherein the second groove comprises one groove in each plate, and the locking pin extending between the second grooves.

8. Pedal assembly according to claim 6, wherein the locking device shaft extends between the two substantially similar plates and the actuator device is arranged in between the two plates.

9. Pedal assembly according to claim 6, wherein each plate comprises one locking device arranged on a respective outside of each plate.

10. Pedal assembly according to claim 6, wherein each plate comprises one locking pin arranged on the respective outside of each plate.

11. A pedal assembly for a motor vehicle, comprising:
a bracket having a first groove,
a pedal shaft arranged in the first groove,
a pedal arm with a first end and a second end, the second end comprising a pedal plate and the pedal arm being pivotally coupled to the bracket via the pedal shall at a position distant from the second end,
an operating device for activation or control of a vehicular function, such as a braking function, a clutching function or the like, and which operating device is pivotally coupled to the pedal arm at an operating device shaft distant from the pedal shaft,
at least one locking device, for locking of the pedal shaft in an operating position in the first groove, the locking device being coupled to the bracket via a locking device shaft, wherein the locking device is releasable in the event of a collision, to allow movement of the pedal shaft in the first groove from the operating position to a safety position,
the bracket having a second groove, a locking pin arranged in a locking position in the second groove, in order to prevent the release of the locking device, and which locking pin is movably disposed relative to the bracket along the second groove from its locking position to a release position in which the locking device is released, and
an actuator device attached to an actuator device shaft and the actuator device is further fastened relative to the bracket at a distance from the actuator device shaft by at least one fastening device, and the actuator device is arranged to rotate around an axis defined by the actuator device shaft in the event of a collision, by means of an external force caused by the collision onto the actuator device, wherein the actuator device is arranged to shear the at least one fastening device and further displace the locking pin from its locking position to the release position, whereby the locking device is allowed to rotate around the axis of the locking device shaft, as the result of the external force, thereby allowing the pedal shaft to move from the operating position to the safety position, wherein the actuator device is a fork-like bracket comprising two shanks connected to each other in a first end, and each shank of the two shanks comprises a second end which respective second end is attached to the actuator device shaft.

12. A pedal assembly for a motor vehicle, comprising:
a bracket having a first groove,
a pedal shaft arranged in the first groove,
a pedal arm with a first end and a second end, the second end comprising a pedal plate and the pedal arm being pivotally coupled to the bracket via the pedal shaft at a position distant from the second end,
an operating device for activation or control of a vehicular function, such as a braking function, a clutching function or the like, and which operating device is pivotally coupled to the pedal arm at an operating device shaft distant from the pedal shaft,
at least one locking device, for locking of the pedal shaft in an operating position in the first groove, the locking device being coupled to the bracket via a locking device shaft, wherein the locking device is releasable in the event of a collision, to allow movement of the pedal shaft in the first groove from the operating position to a safety position,
the bracket having a second groove, a locking pin arranged in a locking position in the second groove, in order to prevent the release of the locking device, and which locking pin is movably disposed relative to the bracket along the second groove from its locking position to a release position in which the locking device is released, and
an actuator device attached to an actuator device shaft and the actuator device is further fastened relative to the bracket at a distance from the actuator device shaft by at least one fastening device, and the actuator device is arranged to rotate around an axis defined by the actuator device shaft in the event of a collision, by means of an external force caused by the collision onto the actuator device, wherein the actuator device is arranged to shear the at least one fastening device and further displace the locking pin from its locking position to the release position, whereby the locking device is allowed to rotate around the axis of the locking device shaft, as the result of the external force, thereby allowing the pedal shaft to move from the operating position to the safety position,
wherein the locking device has a first end which is arranged to lock the pedal shaft in the operating position, and a second end distant from the first end, which second end comprises a recess arranged to hold the locking pin in its locking position.

13. Pedal assembly according to claim 12, wherein the locking device shaft is arranged between the first end and the second end of the locking device and the locking device is pivotally coupled at the locking device shaft.

* * * * *